3,097,087
HERBICIDAL MIXTURE COMPRISING A CRABGRASS KILLER AND A HETEROCYCLIC POLYMER
Jesse Werner, Holliswood, N.Y., and Frederick A. Hessel, Upper Montclair, N.J., assignors to General Aniline & Film Corporation, New York, N.Y., a corporation of Delaware
No Drawing. Filed Jan. 13, 1961, Ser. No. 82,394
5 Claims. (Cl. 71—2.4)

The present invention relates to an improved selective herbicide for the control of crabgrass.

Crabgrass is of great economic significance in ornamental landscaping, especially lawns. It uses space, water and nutrient materials intended for cultivated species of grasses, and by its presence interferes with and diminishes the growth of the desirable species. Many selective herbicides, i.e., those which act preferentially on one species or group of plants, and not on another, have been proposed. In the control and eradication of crabgrass on Kentucky bluegrass, Chewings fescue, and Astorial colonial bent several inorganic and organic compounds are available commercially and currently used.

The inorganic compounds such as potassium cyanate (KOCN) and the organic compounds such as phenyl mercuric acetate and phenyl mercuric ethanol ammonium lactate all give control of crabgrass of 90 to 100% with very little permanent injury to the basic or desirable grasses, provided that they are employed at concentrations recommended by the manufacturer. The only shortcoming of these compounds, both inorganic and organic, is that while they kill crabgrass they discolor the desirable grasses.

Although the discoloration may be temporary, and the compounds employed are not seriously injurious if used as recommended, many homeowners and caretakers of lawns hesitate, and in a majority of cases refrain from using these compounds in the control and eradication of the serious pest, crabgrass, in fine lawns. It is presumed that the discoloration, especially of wide areas of a lawn disturbs the finer esthetic sensibilities of the observer when contrasted with the adjacent green portions or areas. Also in hot weather normal color may not be regained and the desirable grass may die.

To overcome the foregoing shortcoming of the commercially available weedicides or herbicides employed in the selective control of crabgrass constitutes the principal object of the present invention.

Another object of the present invention is to provide herbicidal compositions which may be employed in the control of crabgrass and which do not affect desirable grasses.

Still another object of the present invention is to provide a process for the control of crabgrass whereby injury to good grasses does not obtain.

Still further objects and advantages will appear hereinafter as the description proceeds.

It has been found that the discoloration of good grasses by the aforementioned inorganic and organic herbicides is completely overcome by employing a mixture of the herbicide with an N-vinyl heterocyclic containing polymer hereinafter to be described. The presence of such polymers in the mixture completely eliminates the discoloring effect of the active ingredient, i.e., the herbicide, on desirable grasses without impairing, reducing or delaying the herbicidal acticity against crabgrass.

In practicing the present invention, all that is required is to mix the selected polymer with another one of the aforementioned herbicides in a concentration range from 2 to 25% (calculated on the basis of the N-vinyl heterocyclic compound) based upon the weight of the herbicidal content. The commercially available preparations for the control of crabgrass are either in powder or liquid form. The potassium cyanate is normally compounded to contain inert water-soluble or water-dispersible fillers, and the percentage of active ingredient may range from 50 to 98%, the remainder being the filler or dispersing material. In the liquid preparations, particularly those containing the mercury compounds, the concentration of the latter may range from 1–12 to 5% in an alcohol aqueous solution which may contain, if desired, a wetting agent. With respect to the dry preparations, i.e., potassium cyanate, the polymer may be added thereto prior or subsequent to final formulation i.e., the addition of filler or wetting agent. The solid inorganic materials such as potassium cyanate compounded in dry form, may also be compounded in liquid form in which the concentration of the active ingredients may be at saturation or near saturation. In such case, a concentrated aqueous solution of the polymer may be added so as to obtain a concentration of 2 to 25% of polymer based upon the weight of the active herbicidal component. In the preparation of the mercuric compounds in aqueous alcohol solution, 2 to 25% of dry polymer based on the weight of the mercuric compound may be added and both dissolved in the aqueous alcohol solution. Inasmuch as the formulation of both dry and liquid herbicides are well known to those skilled in the art, no difficulty will be encountered in practicing the present invention. It is to be noted that the proportions of the active ingredients in both the dry and liquid formulations are not critical as long as a sufficient quantity is present to display selective herbicidal activity.

The polymers which are contemplated herein include both homopolymers and copolymers of N-vinyl pyrrolidones, N-vinyl oxazolidones, N-vinyl imidazole, and N-vinyl-3-morpholinones. Where the homopolymer is employed, the amounts thereof will be 2 to 25% by weight based upon the weight of the herbicidal content. When copolymers are used, then the amount to be employed will be based on the N-vinyl heterocyclic content of the copolymers. Thus a copolymer containing 50% vinyl pyrrolidone and 50% vinyl acetate would be used in amounts of from 4 to 50% by weight based upon the weight of the herbicidal content. Each of the aforementioned N-vinyl heterocyclic monomers when in polymeric form is characterized as a water soluble polymer. Where it is desired to employ aqueous solutions of herbicidal materials, then it is preferred to use copolymers which are also water soluble. Depending upon the comonomer used with the selected N-vinyl heterocyclic compound, the minimum content of the copolymer of N-vinyl heterocyclic component will vary. To obtain in most instances a water soluble copolymer, it is preferred that the N-vinyl heterocyclic component be present to the extent of at least about 30%. However, as indicated above with some comonomers such as, for example, vinyl stearate, a much higher percentage of the N-vinyl heterocyclic compound must be used. Examples in detail will be given below. Where the materials are to be used in the dry or powdered form in the absence of any solvent or liquid carrier, then the solubility of the polymer is of little import. In such cases, then, the N-vinyl heterocyclic component may be considerably less than is necessary to effect water solubility or indeed, any solvent solubility. Notwithstanding this, however, it is preferred that in all cases the minimum N-vinyl heterocyclic content of the copolymers to be used be not less than 10% by weight of the copolymer.

Suitable examples of N-vinyl pyrrolidones which may be homopolymerized or copolymerized include the following:

N-vinyl-2-pyrrolidone
5-methyl-N-vinyl-2-pyrrolidone
5-ethyl-n-vinyl-2-pyrrolidone
3,3-dimethyl-N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone
3-phenyl-3-β-diethylamine-ethyl-N-vinyl-2-pyrrolidone
5-hydroxymethyl-N-vinyl-2-pyrrolidone Suitable N-vinyl-3-morpholenes include the parent compound as well as the alkyl substituted derivatives thereof, e.g., 2,6-dimethyl and 5-methyl. Such compounds are described in the application of R. L. Mayhew and S. A. Glickman, Serial No. 781,440, filed December 19, 1958, the entire specification of which is incorporated herein by reference thereto.

The N-vinyl-2-oxazolidones which may be employed as the polymeric substances are characterized by the following general formula:

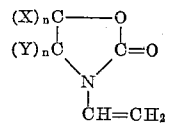

wherein X and Y are independently selected from the group consisting of hydrogen, alkyl radicals of from 1 to about 4 carbon atoms and aryl radicals containing from 6 to about 10 carbon atoms. Such monomers are fully described in U.S. Patent 2,891,058, and the disclosure therein relating to this class of heterocyclic vinyl compounds is incorporated herein by reference thereto. Some of the specific derivatives in addition to the parent N-vinyl-2-oxazolidone mentioned may be made of N-vinyl-5-methyl-2-oxazolidine
N-vinyl-4,5-dimethyl-2-oxazolidone
N-vinyl-5-ethyl-2-oxazolidone
N-vinyl-5-phenyl-2-oxazolidone
N-vinyl-5-butyl-2-oxazolidone
N-vinyl-5-propyl-2-oxazolidone
N-vinyl-4,5-diethyl-2-oxazolidone Similarly as above, in addition to the parent compound, N-vinyl imidazole, the various alkyl (1 to about 4 carbon atoms), aryl (6 to 10 carbon atoms, e.g., phenyl, tolyl, xylyl, etc.), alkoxy (methoxy, ethoxy, n-propoxy, n-butoxy, etc.) and the like derivatives thereof may be used.

The homopolymers and copolymers which are employed in the compositions of the present invention are readily prepared in the customary manner by polymerizing the aforementioned N-vinyl heterocyclic compounds alone, mixtures thereof, or in admixture with another polymerizable ethylenically unsaturated comonomer in a lower alcohol solvent, in bulk, in emulsion or aqueous solution. Instead of alcohol, the monomers and comonomers may be dissolved or dispersed in water or an organic solvent, such as benzene, dioxane, acetone, methyl ethyl ketone, ethylene dichloride or mixture or such organic solvents. The solution or dispersion of the two monomers is then heated in the usual manner preferably in the absence of air (nitrogen blanket) and in the presence of a polymerizing catalyst such as organic peroxides, peracids, hydroperoxides, i.e., benzoyl peroxide, lauroyl peroxide, tertiary butyl perbenzoate, hexoyl peroxide, methyl ethyl ketone peroxide, α-azodiisobutyronitrile and the like.

The polymers and copolymers which may be employed have molecular weights ranging from about 500 to 500,000. Those which are preferred have a range of Fikentscher K values of from about 10 to about 100. The K value as used herein is a well recognized term in the polymer art, and a definition thereof is given in Modern Plastics, vol. 23, pages 157–61 (November 1945).

Among the suitable polymerizable ethylenically unsaturated comonomers which may be copolymerized or interpolymerized with the foregoing N-vinyl heterocyclic compounds mention may be made of vinyl chloride, vinyl acetate, and other vinyl carboxylic esters, acrylic and methacrylic compounds, e.g., methylacrylate, methylmethacrylate, etc., acrylonitrile, acrylamide and the like, vinyl alkyl and aryl ethers, e.g., methyl vinyl ether, ethyl vinyl ether, vinyl-α-naphthylether, and the like.

Examples of specific copolymers which may be employed in the composition of this invention are the following (1) N-vinyl pyrrolidone, 90%, vinyl acetate, 10%
(2) N-vinyl pyrrolidone, 70%, vinyl acetate, 30%
(3) N-vinyl pyrrolidone, 50%, vinyl acetate, 50%
(4) N-vinyl pyrrolidone, 30%, vinyl acetate, 70%
(5) N-vinyl pyrrolidone, 90%, vinyl stearate, 10%
(6) N-vinyl pyrrolidone, 85%, acrylonitrile, 15%
(7) N-vinyl pyrrolidone, 60%, methylacrylate, 40%
(8) N-vinyl pyrrolidone, 50%, isobutyl vinyl ether, 50%
(9) N-vinyl pyrrolidone, 80%, styrene, 20%
(10) N-vinyl pyrrolidone, 25%, styrene, 75%
(11) N-vinyl pyrrolidone, 90%, vinyl pyridine, 10%
(12) N-vinyl pyrrolidone, 70%, vinyl chloride, 30%
(13) N-vinyl pyrrolidone, 87%, vinylidene chloride, 13%
(14) N-vinyl pyrrolidone, 50%, allyl alcohol, 50%
(15) N-vinyl pyrrolidone, 80%, diallyl phthalate, 20%
(16) N-vinyl pyrrolidone, 60%, maleic anhydride, 40%
(17) N-vinyl pyrrolidone, 85%, vinyl laurate, 15%

In place of N-vinyl pyrrolidone in the above copolymers, one may employ the other N-vinyl heterocyclics herein disclosed.

To determine the degree of general phytotoxicity of various samples of homopolymers derived from the aforementioned N-vinyl heterocyclic compounds having K values of from 10 to about 100, a series of water solutions were prepared containing 10, 20, 30, 40 and 50% of the homopolymers and spraying on the foliage of tomatoes, dogwood, maple, calendula, petunias, geraniums, apples, roses and bluegrass. Toxicity was not evident in acute or chromic form in any one of these species of plants, and clearly demonstrates that the homopolymers alone in small and large concentrations are not toxic to plants.

The following examples will serve to illustrate how the various homocidal preparations containing N-vinyl heterocyclic polymers and copolymers may be prepared in accordance with the practice of the present invention. These examples wherein parts are by weight unless otherwise indicated are merely exemplary and are not to be construed as limitative of the invention disclosed.

*Example 1*

Four bluegrass turf plots containing crabgrass are selected and marked off to contain 50 sq. ft. of area in each plot. They are then sprayed with the following dosages of indicated materials:

| Plot | Dosage |
|---|---|
| 1 | Normal dosage which consists of 1 oz. of 1.75% of phenyl mercuric acetate in aqueous alcohol per 2 qts. of water; all of which is applied to the 50 sq. ft. |
| 2 | Twice normal dosage consisting of 2 oz. of 1.75% of phenyl mercuric acetate in aqueous alcohol per 2 qts. of water; all of which is applied to the 50 sq. ft. |
| 3 | Same materials and dosage as in Plot 1 with the exception that the aforesaid 1 oz. of aqueous alcohol phenyl mercuric acetate contains 18% based on the weight of the phenyl mercuric acetate of polyvinyl pyrrolidone, having a K value of 30; all of which is applied to the 50 sq. ft. |
| 4 | Twice the normal dosage of the materials applied to Plot 3. |

About two weeks after the application of the above materials, the plots are inspected and the following observations noted:

| Plot | Injury |
|---|---|
| 1 | Severe injury to bluegrass and crabgrass. |
| 2 | Very severe injury to all grasses. Most of the area appeared dead. |
| 3 | Very slight injury to bluegrass, and only noticeable upon close inspection. Crabgrass turned yellow. |
| 4 | Very slight injury to bluegrass tips, but moderate to severe injury to crabgrass. Much of the crabgrass appeared dead. |

Plot 4 is again inspected about two weeks later, and at this time most of the crabgrass is dead.

*Example II*

Example I is repeated with the exception that flats of bluegrass containing crabgrass are treated under greenhouse conditions. The results obtained are identical with those in Example I.

*Example III*

Four bluegrass turf plots containing crabgrass are selected and each marked off to contain 50 sq. ft. They are then sprayed with the following materials and dosages as indicated:

| Plot | Dosage |
|---|---|
| 1 | Normal dosage consisting of 1 oz. of potassium cyanate per 2 qts. of water; all of which are applied to 50 sq. ft. |
| 2 | Twice the normal dosage of Plot 1. |
| 3 | Normal dosage of Plot 1, but in addition the 1 oz. of potassium cyanate contains 18% based on the weight of cyanate of polyvinyl pyrrolidone, having a K value of 28. |
| 4 | Twice the normal dosage of Plot 2, but the 1 oz. of potassium cyanate contains in addition 18% based on the weight of cyanate of polyvinyl pyrrolidone, having a K value of 28. |

Two weeks after the above applications, the plots are inspected, and the following observations noted:

| Plot | Injury |
|---|---|
| 1 | Severe injury to all grasses. |
| 2 | Very severe injury to all grasses. Most of the area dead. |
| 3 | Very slight injury to bluegrass and only noticeable upon close inspection. Crabgrass turned yellow. |
| 4 | Very slight injury to bluegrass tips, but moderate to the crabgrass with much of the crabgrass appearing dead. |

A week later, plot 4 showed that most of the crabgrass is dead.

*Example IV*

Example I is again repeated except that in place of 18% polyvinyl pyrrolidone, there is used 36% based on the weight of the phenyl mercuric acetate of a copolymer of 50% vinyl pyrrolidone and 50% vinyl acetate. Comparable results are obtained.

*Examples V–X*

Example I is again repeated employing in lieu of 18% polyvinyl pyrrolidone, the following amounts of the copolymers in the table below:

| Example | Copolymer, Percent by Weight Based on Weight of Vinyl Mercuric Acetate |
|---|---|
| V | 70% vinyl pyrrolidone, 30% vinyl chloride (K=42), 30%. |
| VI | 20% vinyl pyrrolidone, 80% vinyl methyl ether (K=25), 20%. |
| VII | 90% 3-methyl-N-vinyl-2-pyrrolidone, 10% vinyl bromide (K=40), 20%. |
| VIII | 94% vinyl pyrrolidone, 6% vinyl stearate (K=38), 15%. |
| IX | 50% vinyl morpholine, 50% vinyl acetate (K=30), 40%. |
| X | 20% vinyl morpholine, 80% methyl acrylate (K=20), 10%. |

*Example XI*

Example III is repeated employing first 10% polyvinyl oxazolidone and then 20% of this homopolymer based on the weight of the potassium cyanate in lieu of the polyvinyl pyrrolidone of that example.

*Example XII*

Example XI is repeated employing polyvinyl imidazole as the homopolymer.

In all of the above examples excellent control of the crabgrass is obtained.

In actual field practice, the number of applications of any one of the foregoing compositions may vary depending upon the temperature and moisture conditions. For lawns and other turf areas, three applications are sufficient. However, at times, two applications will give favorable control. The treatment should be made every seven to ten days, or according to the manufacturer's directions. The herbicidal compositions may be applied at any time during the day, and preferably when the temperature is below 100° F.

In some instances, especially where the crabgrass infestation is exceedingly heavy, it is desirable to use an equal mixture of potassium cyanate and any one of the aforementioned mercury compounds in a concentration ranging from 5 to 35%. To the mixture may be added 5 to 25% of chlordane (1,2,4,5,6,7,8,8-octachloro-4,7-methano-3a,4,7,7a-tetrahydroindane). The latter mixture if applied at weekly intervals from the middle of June for 2–3 weeks is exceedingly beneficial on the control and eradication of crabgrass seedlings. A mixture consisting of 10% of phenyl mercuric acetate, 10% of phenyl mercuric ethanol ammonium lactate and 40% of potassium cyanate may also be employed with satisfactory results.

It is to be understood that in all of the foregoing mixtures it is essential that the N-vinyl heterocyclic polymeric material be present in the aforestated concentrations so as to reduce or eliminate the phytotoxic effect of the herbicidal mixture on good or desirable grasses.

This application is a continuation-in-part of application Serial No. 488,434, filed February 15, 1955, now abandoned.

We claim:

1. A herbicidal composition for the control of crabgrass comprising at least one herbicidal material selected from the group consisting of potassium cyanate, phenyl mercuric acetate, and phenyl mercuric ethanol ammonium lactate, and from 2 to 25% based upon the weight of said herbicidal material of an N-vinyl heterocyclic polymer selected from the group consisting of homopolymers and copolymers of vinyl pyrrolidone, vinyl morpholinone, vinyl oxazolidone, and vinyl imidazole and mixtures thereof, the said 2 to 25% being calculated on the basis of the N-vinyl heterocyclic component, the said homopolymers and copolymers having a K value of from about 10 to about 100.

2. A herbicidal composition for the control of crabgrass according to claim 1 wherein the polymer is polyvinyl pyrrolidone.

3. A herbicidal composition for the control of crabgrass according to claim 1 wherein the polymer is polyvinyl oxazolidone.

4. A herbicidal composition for the control of crabgrass according to claim 1 wherein the polymer is polyvinyl morpholinone.

5. A herbicidal composition for the control of crabgrass according to claim 1 wherein the polymer is polyvinyl imidazole.

References Cited in the file of this patent

UNITED STATES PATENTS

| | | |
|---|---|---|
| 2,625,471 | Mowry et al. | Jan. 13, 1953 |
| 2,652,322 | Hedrick et al. | Sept. 15, 1953 |
| 2,652,323 | Mowry et al. | Sept. 15, 1953 |

OTHER REFERENCES

De France: "The Flower Grower," vol. 35, pages 528 and 530, July 1948.

Ahlgren et al.: "Principles of Weed Control," John Wiley & Sons, Inc., New York, 1952, pages 61, 63, and 218 to 220.

Frear: "Chemistry of Pesticides," D. Van Nostrand Co., Inc., New York, Third Edition, 1942, page 421.

"Agricultural Chemicals," January 1956, pages 61 and 62.